United States Patent [19]

Muller

[11] Patent Number: 4,692,595
[45] Date of Patent: Sep. 8, 1987

[54] ELECTRICALLY OPERATED HEATING ELEMENT FOR A HOT-RUNNER TOOL

[75] Inventor: Walter Muller, Battenberg, Fed. Rep. of Germany

[73] Assignee: Ewikon Entwicklung und Konstruktion GmbH & Co., Herford, Fed. Rep. of Germany

[21] Appl. No.: 860,593

[22] Filed: May 7, 1986

Related U.S. Application Data

[62] Division of Ser. No. 653,990, Sep. 24, 1984, Pat. No. 4,631,389.

[30] Foreign Application Priority Data

Sep. 29, 1983 [DE] Fed. Rep. of Germany ....... 3335296
Sep. 29, 1983 [DE] Fed. Rep. of Germany ....... 3335294
Nov. 7, 1983 [DE] Fed. Rep. of Germany ....... 3425518

[51] Int. Cl.$^4$ ...................... B29C 45/74; B29C 45/30; H05B 3/06
[52] U.S. Cl. ..................................... 219/421; 219/426; 425/549; 425/DIG. 13
[58] Field of Search .................. 219/421, 422, 426; 425/549, 547, 548, 570, 564, DIG. 13

[56] References Cited

U.S. PATENT DOCUMENTS

| 3,520,026 | 7/1970 | Stidham | 219/421 |
| 4,285,660 | 8/1981 | Mueller | 219/421 |
| 4,312,630 | 1/1982 | Travaglini | 219/421 |
| 4,422,841 | 12/1983 | Alfonsi | 219/421 |

Primary Examiner—E. A. Goldberg
Assistant Examiner—Teresa J. Walberg
Attorney, Agent, or Firm—Sprung Horn Kramer & Woods

[57] ABSTRACT

An electrically operated heating element for a hot-runner tool has a heat conductor and is positioned in a hot runner and in runners that derive from the heat conductor and lead to a series of outflow channels 8 from the hot-runner tool. The heat conductor is a flat body with tongues on the side toward the outflow apertures, each tongue extending to the vicinity of one outflow aperture.

10 Claims, 12 Drawing Figures

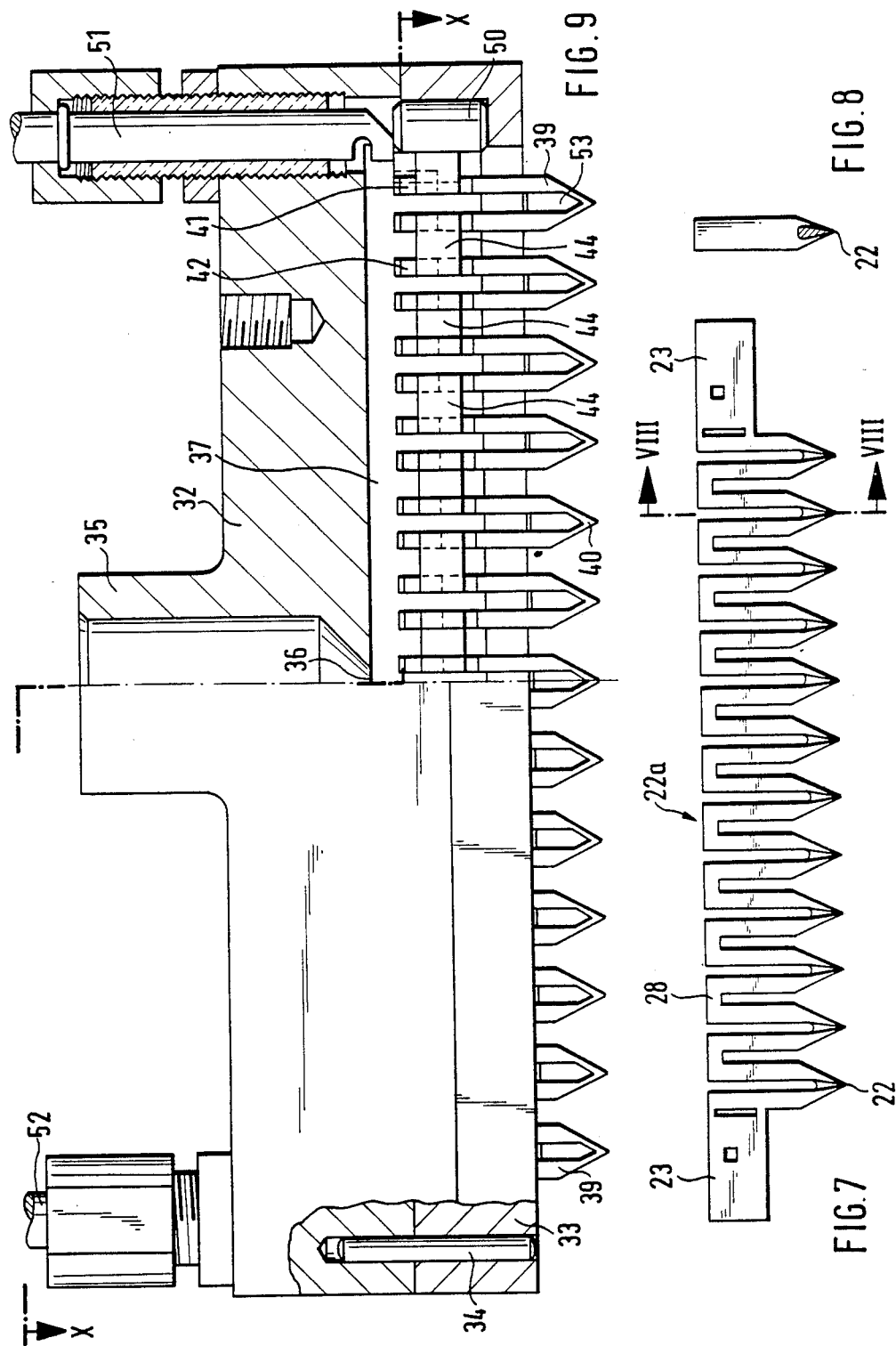

ELECTRICALLY OPERATED HEATING ELEMENT FOR A HOT-RUNNER TOOL

This is a division of application Ser. No. 653,990, filed Sept. 24, 1984, now U.S. Pat. No. 4,631,389.

BACKGROUND OF THE INVENTION

The present invention relates to an electrically operated heating element for a hot-runner tool that has a heat conductor and is positioned in a hot runner and in runners that derive from the heat conductor and lead to a series of outflow channels from the hot-runner tool.

A hot-runner tool with an electrically operated heating element is known from AT-PS No. 286 607. Its heat conductor is a rod or wire and is positioned in the center of the tool runner tool where it forms a loop in the vicinity of the runners that derive from the hot runner. The flanks of the loop extend along the inside of the runners. One drawback of the known hot-runner tool is that the rod-shaped or wire-shaped conductor can deform as a result of the impact of molten plastic entering the hot runner and come into contact with the surfaces of the hot-runner tool. This contact causes an immediate short circuit and downtime.

Furthermore, since the heat conductor has the same cross-section at all points, the same amount of heat will be generated at every point.

Since the heat conductor forms a loop in the vicinity of one runner and the loop can only be employed in runners with relatively large diameters, the known hot-runner tool cannot be employed for an injection mold in which the feed apertures in the mold nests are slightly separated and in which small parts are cast.

SUMMARY OF THE INVENTION

One object of the present invention is to provide an electrically operated heating element of the aforesaid type whereby the hot-runner tool that is equipped with it can be associated with an injection mold with a series of mold nests wherein the feed apertures of adjacent form nests are only slightly separated.

This object is attained in accordance with the invention in that the heat conductor is a flat body with tongues on the side toward the outflow apertures, each tongue extending to the vicinity of one outflow aperture. The free end of each tongue in one practical embodiment is a point.

The tongues can be in one piece with the flat body or separate components fastened to it. The tongues can be made out of a material that is different from the material that the flat body is make out of and the tongues can have a higher specific electric resistance than the flat body.

There can also be connector plates at each end of the flat body for application of an electric voltage and having a lower specific electric resistance than the flat body.

Designing the heat conductor as a flat body and a series of tongues makes the heat conductor mechanically strong and dimensionally stable enough to unobjectionably withstand the impact of molten material entering the hot runner.

Supporting pins made out of an insulating material can rest against the sides of the flat body to position the heat conductor even more securely. The supporting pins can be supporting screws that screw into threaded bores in the hot-runner tool and activated from outside.

Further, the tongues can be between 5 and 15 mm apart and there can be recesses in the flat body above each tongue.

Another object of the invention is to provide an electrically operated heating element of the aforesaid type wherein the orientation of the heat conductor in relation to the outflow apertures in the hot-runner tool will remain constant subject to the heat expansion that occurs in the tool during operation and that differs from that of the built-in heat conductor, which will accordingly withstand the impact of molten material entering the tool.

This object is attained in accordance with the invention in that the heat conductor is composed of U-shaped webs and is positioned between two plates made out of an insulating material and resting against the conductor, which rests on or is fastened to mounts, the ends of which are positively inserted in mounting recesses in the hot-runner tool.

The U-shaped webs make the heat conductor resilient in shape and it can also be materially resilient by selecting resilient materials.

The ends of the mounts that the heat conductor rests on or is fastened to and that are positively inserted in mounting recesses in the hot-runner tool force the conductor to reproduce the motion resulting from the heat expansion of the tool. The resiliency of the heat conductor with respect to shape and material allows this without damage to the conductor. The synchronized movement of the heat conductor and the hot-runner tool subject to the heat stresses that occur during operation ensures a constantly precise orientation of the conductor in relation to the outflow apertures in the hot-runner tool, providing the prerequisites for unobjectionable injection molding.

The plates of insulating material at the center of the heat conductor and resting on the one hand against the conductor and on the other against the inside of the runners in the hot-runner tool reliably secure the conductor along its total length even while molten material is flowing through or around it on the way from the hot runner to the outflow apertures from the tool.

The plates of insulating material, ceramic for example, form, in conjunction with webs on the heat conductor, flow channels for the molten material.

Other characteristics of the invention will be evident from the following.

Some preferred embodiments of the invention will now be described with reference to the attached drawings, wherein

BRIEF DESCRIPTION OF THE DRAWINGS

FIG. 7 is a front elevation of the electrically powered heating element in FIGS. 5 and 6, FIG. 8 is a section along the line VIII—VIII in FIG. 7, FIG. 9 is a partly sectional front elevation of a hot-runner tool with an electrically powered heating element of a different design built in.

DETAILED DESCRIPTION OF THE PREFERRED EMBODIMENTS

Figure 2:
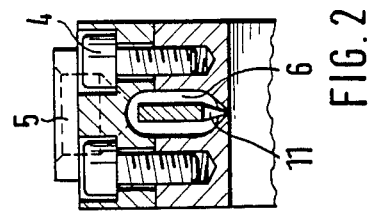
FIG. 2 is a section along the line II—II in FIG. 1.

As shown in FIGS. 1–4, a hot-runner tool 1 consists of a top 2 and of a bottom 3. Top 2 is fastened to bottom 3 with screws 4 and can be removed from it. Top 2 has a bushing 5 that demarcates a gate for the molten plastic. The flow channel constituted by bushing 5 empties into a hot runner 6, from which runners 7 diverge, each leading to an outflow aperture 8.

Hot-runner tool 1 has a heat conductor 9 with a flat body 10 made out of a material with a high specific electric resistance. Flat body 10 has projecting tongues 11 on the side facing outflow apertures 8. Each tongue 11 extends into the vicinity of one outflow aperture 8. The free end of each tongue is pointed. Although tongues 11 can be in one piece with flat body 10, they can also be separate components attached to the flat body, in which case they can be made out of a different material than that of the body. Tongues 11 can have a higher specific electric resistance than flat body 10 to increase the amount of heat generated in their vicinity.

Also to increase the amount of heat generated in the vicinity of tongues 11, each tongue can have recesses 12 or 13 that increase the current density in that vicinity. As will be evident from FIG. 1, the shape of recesses 12 or 13 can differ.

In order to concentrate the development of heat in heat conductor 9 essentially in the vicinity of flat body 10 and tongues 11, connector plates 14, which have an essentially lower specific electric resistance than that of the body and by means of which an electric voltage can be applied at point 15, are welded to the ends of the flat body in the embodiment illustrated.

Figure 4:
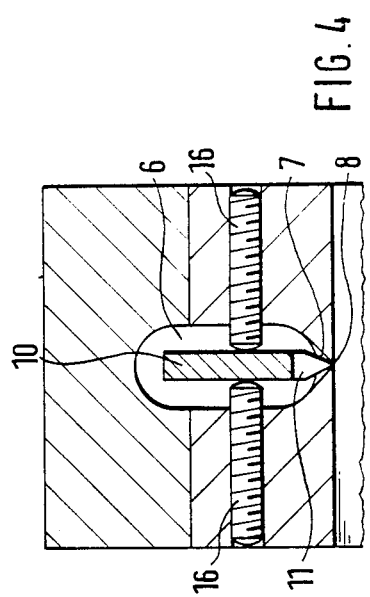
FIG. 4 is a larger-scale section along the line IV—IV in FIG. 3.

As will be evident from FIG. 4, flat body 10 is secured in position with supporting screws 16 made out of an insulating material, ceramic for instance, screwed into a threaded bore in hot-runner tool 1, and accessible from outside.

Figure 1:
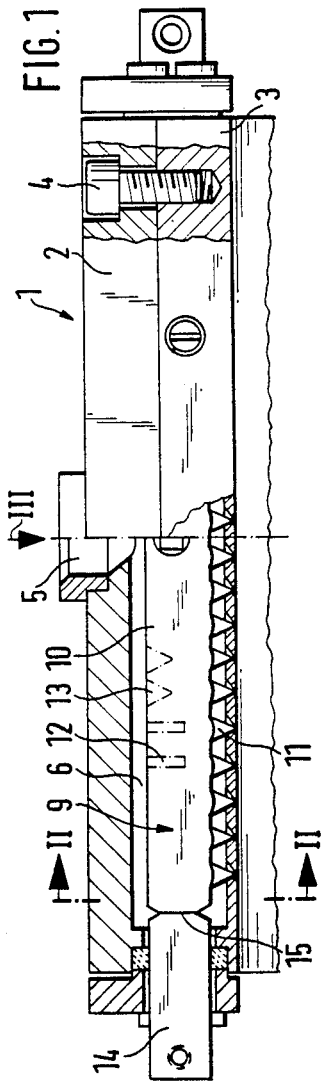
FIG. 1 is a partial section through a hot-runner tool 1.
Figure 3:
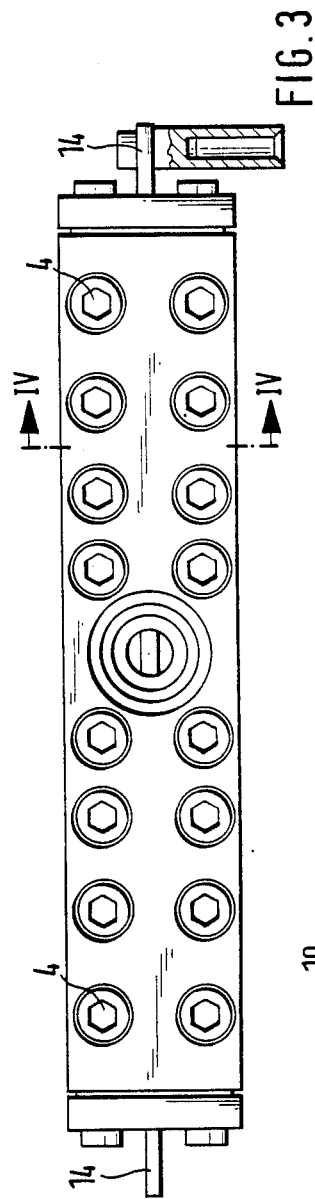
FIG. 3 is a view along the direction indicated by the arrow III in FIG. 1.

As will be evident from FIG. 1, since the interval between two adjacent tongues 11 is very narrow, hot-runner tool 1 can be associated with an injection mold in which the mold-nest gates are separated by the same narrow interval. Adjacent tongues can be separated by an interval ranging from 5 to 15 mm.

The hot-runner tool 17 illustrated in FIGS. 5–8 has a hot runner 18 that is supplied with molten material through an inflow aperture 19.

A series of runners 20 diverge from hot runner 18 and lead to an outflow aperture 21 from which the molten material arrives in the mold nest of an injection mold.

Hot-runner tool 17 has a heat conductor 22a that heats the molten material both in hot runner 18 and in runners 20. Heat conductor 22a can be made of a chrome-nickel steel and has connector plates 23 to which an electric voltage can be applied at each end. The section of heat conductor 22a between connector plates 23 is composed of U-shaped webs with their bottom ends, which face the tool outflow openings or the mold nests, in the form of points 22. Adjacent webs 24 combined into points 22 have cross-sections that diminish toward the points. This increases the heat output in this area and ensures that the molten material can flow into the injection-mold nest through the outflow aperture in the hot-runner tool subject to satisfactory flow conditions.

The connector plates 23 that accommodate the electric voltage and the heat-conductor webs in the illustrated embodiment have a rectangular cross-section.

Heat conductor 22a is mounted in the hot-runner tool in the vicinity of connector plates 23 with bolts 25, which can be made out of an insulating material. If the bolts are made out of metal their ends must be mounted in bushings 26 made out of an insulating material, ceramic for instance. Bushings 26 are mounted in matching recesses in the tool.

Between connector plates 23 the heat conductor is mounted on bolts 27 that engage below transverse webs 28 in heat conductor 22a at the side that faces away from the outflow aperture 21 in the tool. These bolts can also be made out of an insulating material or out of metal. In the latter case the ends of bolts 27 must be mounted as illustrated in FIG. 6 in bushings 26 made out of an insulating material.

Figure 5:
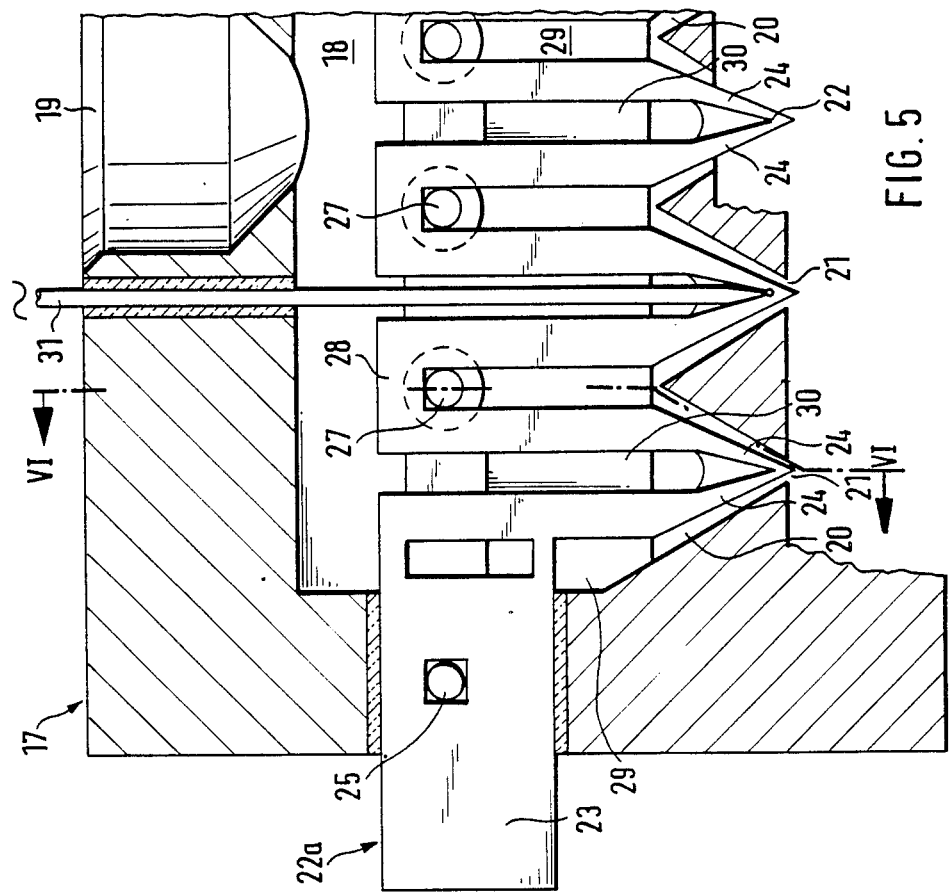
FIG. 5 is a vertical section through another embodiment of a hot-runner tool with an electrically powered heating element.
Figure 6:
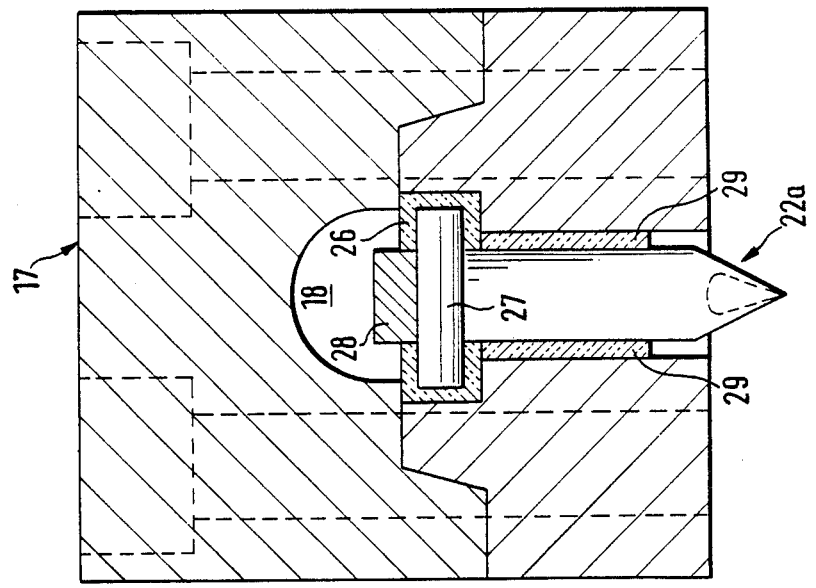
FIG. 6 is a section along the line VI—VI in FIG. 5.
Figure 10:
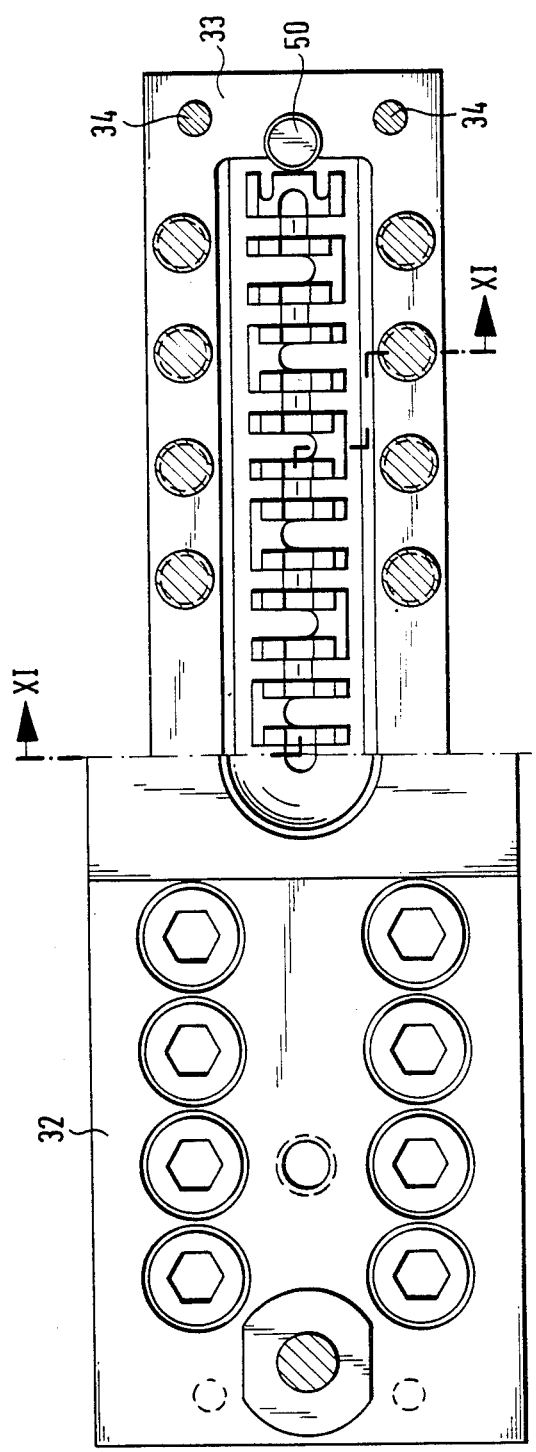
FIG. 10 is a section along the line X—X in FIG. 9.

The section of the heat conductor between connector plates 23 is positioned between plates 29 that are made out of an insulating material, ceramic for example, and extend as will be evident from FIGS. 5 and 6 over the midsection of the heat conductor but also over the total length of hot runner 18. As will be evident from FIG. 6, plates 29 contact both heat conductor 22a and the inner surface of the hot runner, providing a secure attachment for the heat conductor. Furthermore, several vertical webs in the heat conductor form, in conjunction with plates 29, flow channels 30 for the molten material to flow through toward the associated outflow aperture 21 in the tool.

To intensify heat generated in the vicinity of points 22 it is possible as illustrated in FIG. 5 to attach the points to a hot wire 31, in which an electric voltage can be generated.

The hot-runner tool illustrated in FIGS. 9–12 consists of a top 32 and a bottom 33 that are mutually centered by means of pins 34 and that are fastened together and can be separated. The top has a connector 35 that accommodates machine nozzles, through which the molten plastic is introduced from an introduction opening 36 into a hot runner 37 that has runners 38 diverging from it. A hot rod 39 with a point 40 at its free end extends through each runner. Each hot rod has two separated jaws 41 and 42 at the end facing away from the points. Jaws 41 and 42 extend transversely to the longitudinal midplane 43 of the heating element in which the points 40 of hot rod 39 are located.

The adjacent jaws of two hot rods 39 are connected by a bridging web 44 that is displaced with respect to longitudinal midplane 43, with each adjacent bridging web 44 positioned on opposite sides of the midplane.

Jaws 41 and 42 and briding webs 44 are in the vicinity of hot runner 37. To provide the molten plastic being conveyed to the hot runner with an adequate flow cross-section on its way to runners 38, the jaws in the embodiment illustrated in FIGS. 9 through 11 have a central recess 45 extending from their upper demarcating surface.

The jaws project laterally beyond the associated hot rod 39 and form lower supporting surfaces 46 and upper supporting surfaces 47 for insulating bodies 48 and 49, which may be made out of ceramic for example. Insulating bodies 48 and 49 rest against the inner surface of the top and bottom of the tool.

Figure 11:
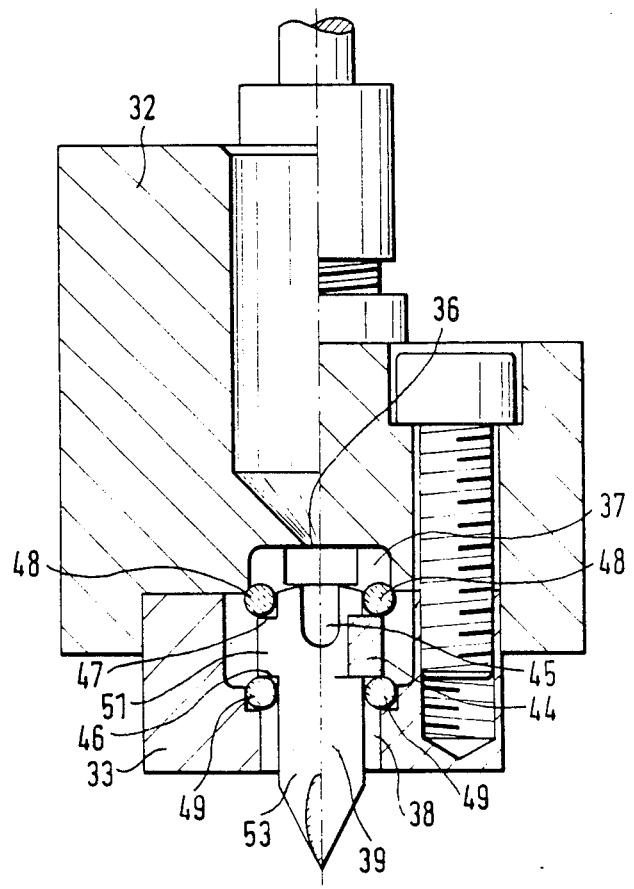
FIG. 11 is a section along the line XI—XI in FIG. 10.
Figure 12:
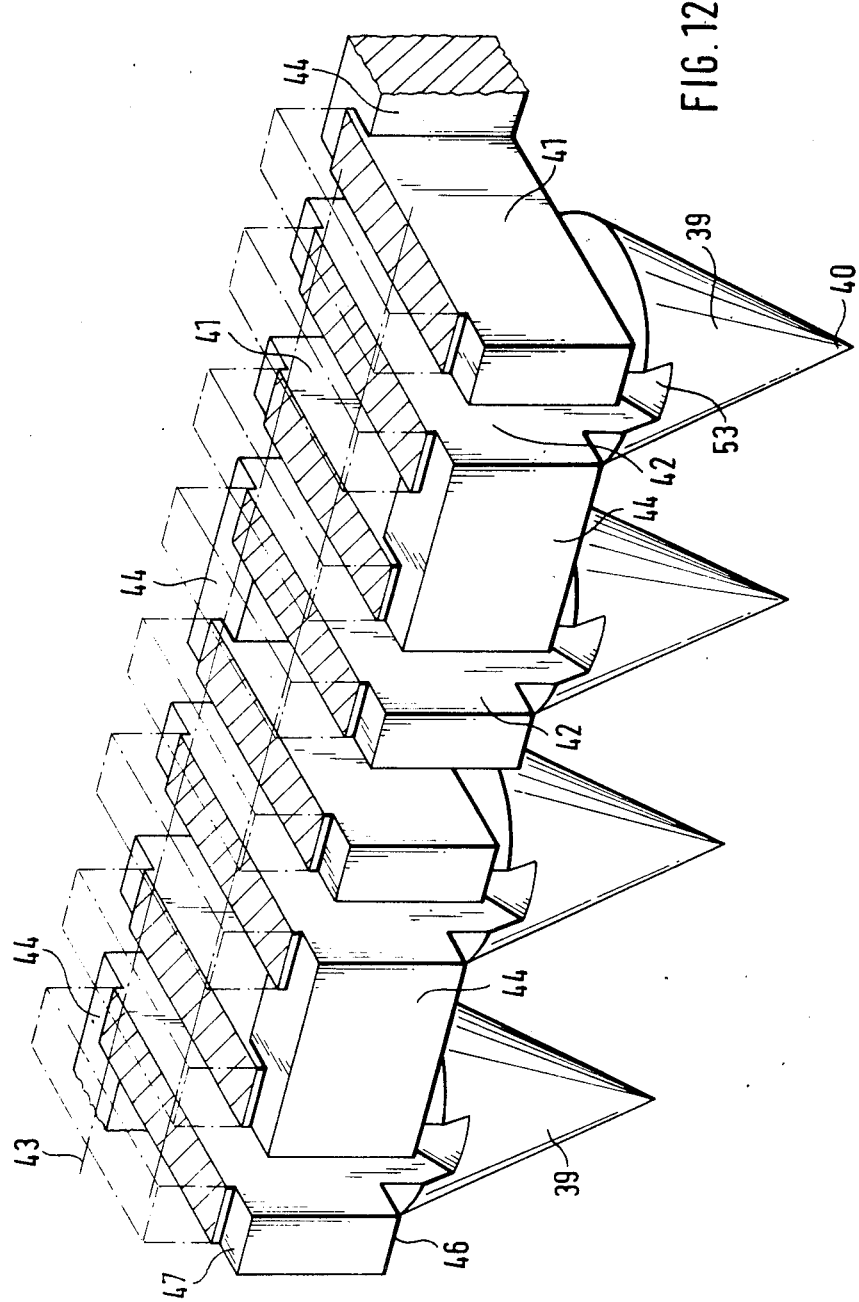
FIG. 12 is a perspective view of part of the heating element in a larger scale.

The insulating bodies 48 and 49 in the embodiment illustrated in FIG. 11 have a round cross-section and extend over the total length of the heating element.

The heating element is tensioned at its faces between pin-like insulating bodies 50, which can also be made out of ceramic.

The heating element is heated by electric resistance. The ends of heating element have connector components 51 and 52 for a source of electric voltage.

Hot rods 39 have flow grooves 53 on two opposing sides. Flow grooves 53 extend from the space demarcated by jaws 41 and 42 toward points 40. The molten plastic flows through the grooves to the gate through the runners.

The displacement of bridging webs 44 with respect to longitudinal midplane 43 and the empty spaces between jaws 41 and 42 allow the jaws to pivot out into the spaces subject to the increased heat stress that occurs during operation so that the heat expansion of the parts of the heat element can be accommodated within the nominal length of the heating element without tensioning of the element generated by the insulating body being overly stressed.

It will be appreciated that the instant specification and claims are set forth by way of illustration and not limitation, and that various modifications and changes may be made without departing from the spirit and scope of the present invention.

What is claimed is:

1. In an electrically operated heating element for a hot-runner tool that has a heat conductor and is positioned in a hot runner and in runners that derive from the heat conductor and lead to a series of outflow channels from the hot-runner tool, the improvement wherein the heat conductor comprises a flat body with tongues on the side toward the outflow channels, each tongue extending to the vicinity of one outflow channel and further comprising recesses in the flat body above each tongue.

2. The electrically operated heating element as in claim 1, wherein the free end of each tongue is a point.

3. The electrically operated heating element as in claim 1 or 2, wherein the tongues are integral with the flat body.

4. The electrically operated heating element as in claim 1 or 2, wherein the tongues comprise separate components fastened to the flat body.

5. The electrically operated heating element as in claim 4, wherein the tongues are composed of a material that is different from the material of the flat body.

6. The electrically operated heating element as in claim 5, wherein the tongues have a higher specific electric resistance than the flat body.

7. The electrically operated heating element as in claim 1, further comprising connector plates at each end of the flat body for application of an electric voltage and having a lower specific electric resistance than the flat body.

8. The electrically operated heating element as in claim 1, further comprising supporting pins composed of an insulating material and resting against the sides of the flat body.

9. The electrically operated heating element as in claim 8, wherein the supporting pins comprise supporting screws screwed into threaded bores in the hot-runner tool.

10. The electrically operated heating element as in claim 1, wherein the tongues are between 5 and 15 mm apart.

* * * * *

UNITED STATES PATENT AND TRADEMARK OFFICE
CERTIFICATE OF CORRECTION

PATENT NO. : 4,692,595

DATED : September 8, 1987

INVENTOR(S) : Walter Müller

It is certified that error appears in the above-identified patent and that said Letters Patent is hereby corrected as shown below:

Title Page, under "Foreign   Line 3, delete Nov. 7, 1983 and
Application Priority Data"   substitute --July 11, 1984--

Signed and Sealed this

Twenty-fourth Day of May, 1988

Attest:

DONALD J. QUIGG

Attesting Officer

Commissioner of Patents and Trademarks